United States Patent Office 3,326,186
Patented June 20, 1967

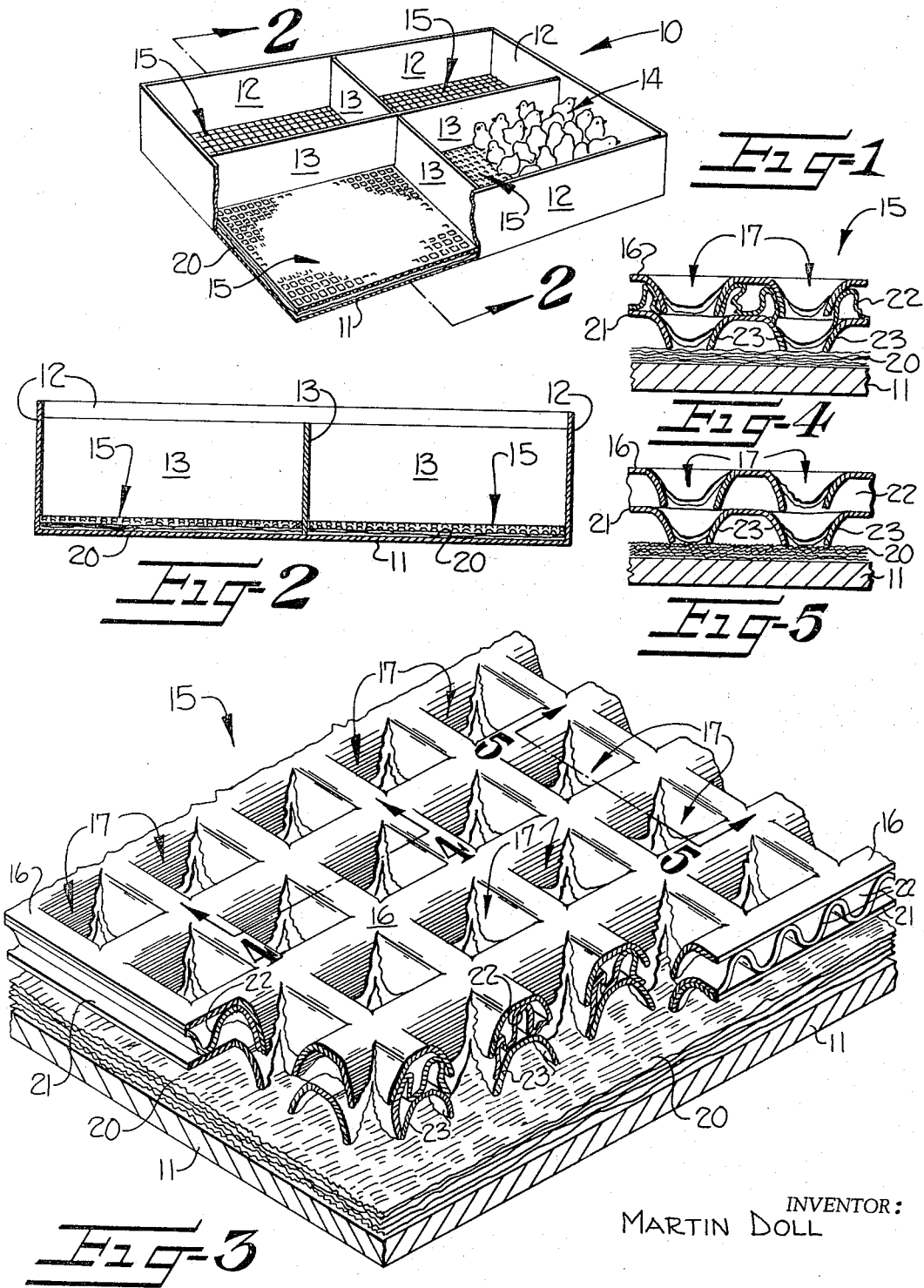

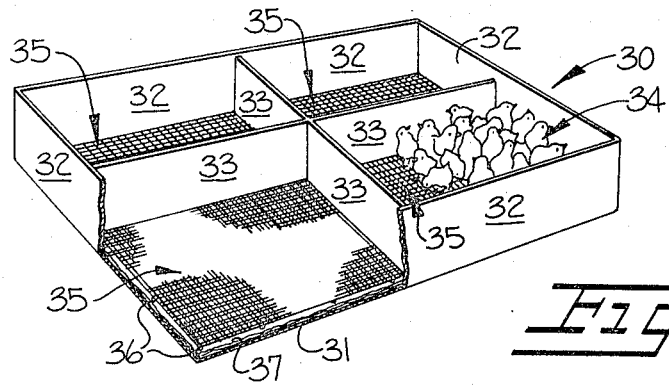
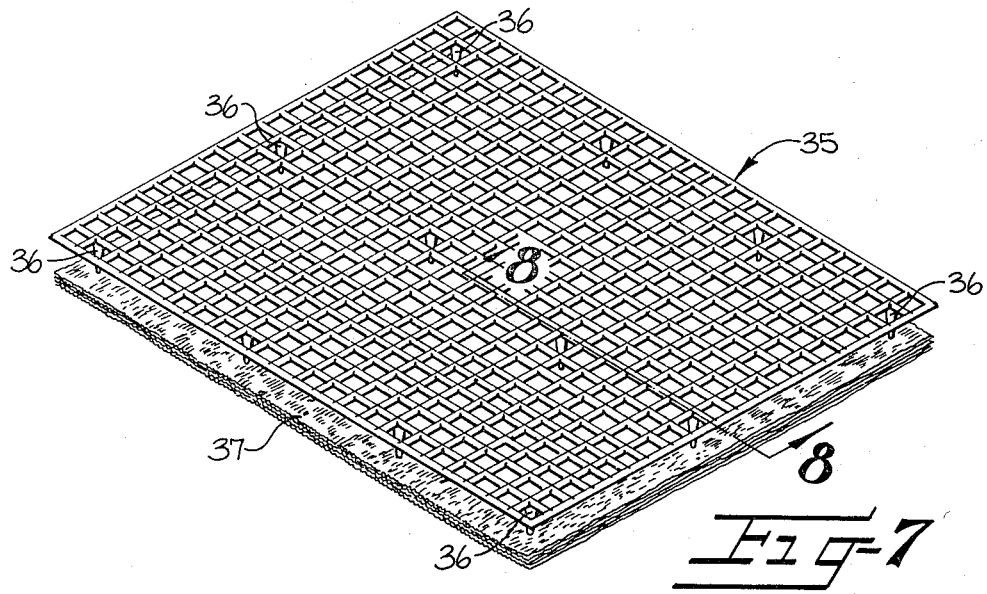
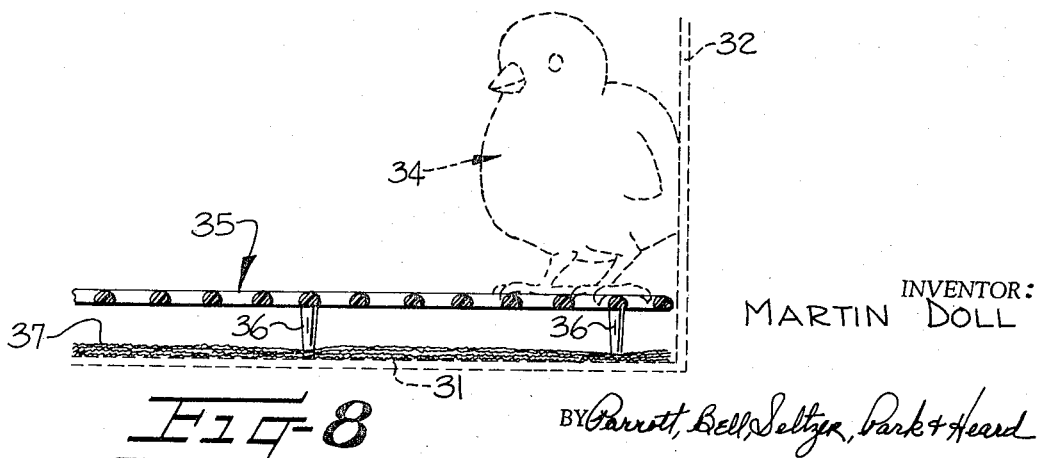

3,326,186
CUSHIONED CHICKEN SHIPPING BOX
Martin Doll, Patterson, N.C. 28661
Filed July 12, 1965, Ser. No. 471,333
10 Claims. (Cl. 119—19)

This invention pertains to a chick box, and more particularly to a chick box in which chicks are supported above the bottom wall of the box and chick droppings are collected beneath and in spaced relation to the chicks.

Newly hatched chicks are conventionally transported from a hatchery to a purchaser, such as a chicken farmer, in chick boxes. Such boxes may be intended for a single use or may be re-usable, but in either instance, typically have a bottom wall defining a floor, outer side walls, interior walls dividing the interior of the box into a plurality of chick compartments, and a removable top. In transporting chicks in such a chick box, it has become conventional to enhance the re-usability of the box by providing means for receiving and at least partially absorbing chick droppings during the time of transport, usually in the form of a mat of excelsior covering the bottom wall of the box.

While the use of such a mat of excelsior as a dropping absorbing means has enhanced the reusability of chick boxes, certain difficulties have been raised by the use thereof. Specifically, the chicks, during the time of transporting, will scratch or tear apart this mat, and consume portions of the excelsior material. In consuming the excelsior material, the chicks also consume droppings, with an understandably deleterious effect on the health of the chicks.

It is, therefore, the object of the present invention to provide an improved chick box in which chicks are supported above the bottom wall of the box and chick droppings are received, collected, and at least partially absorbed beneath and in spaced relation to the chicks to inhibit consumption of the absorbent material and droppings by the chicks and to thereby obviate the aforementioned deficiencies of conventional chick boxes.

This object is preferably accomplished by the combination, with a chick box of otherwise conventional type, of a supporting means spaced a predetermined distance above the bottom wall of the chick box for supporting chicks thereon, and which supporting means is provided with openings for the passage of chick droppings therethrough. Intermediate the supporting means and the bottom wall of the chick box is disposed an absorbent means for receiving, collecting and at least partially absorbing chick droppings passing through the supporting means. During transport, the supporting means supports the chicks spaced above the absorbent means, and thus inhibits the consumption of the absorbent means and droppings by the chicks.

Some of the objects of the invention having been stated, other objects will appear as the description proceeds, when taken in connection with the accompanying drawings, in which—

FIGURE 1 is a perspective view, partly broken away, of a chick box in accordance with this invention;

FIGURE 2 is a sectional view taken as indicated by the lines 2—2, of the chick box of FIGURE 1;

FIGURE 3 is an enlarged perspective view of a portion of the chick box construction of FIGURE 1;

FIGURE 4 is a sectional view, taken along the lines 4—4 of the construction of FIGURE 3;

FIGURE 5 is a sectional view, taken along the lines 5—5, of the construction of FIGURE 3;

FIGURE 6 is a perspective view similar to FIGURE 1 showing a modified form of this invention;

FIGURE 7 is an enlarged perspective view of a portion of the construction of FIGURE 6;

FIGURE 8 is a sectional view, taken substantially as indicated by the lines 8—8, of the construction of FIGURES 6 and 7.

Referring now to the drawings, FIGURE 1 illustrates a chick box, indicated generally 10, as prepared for use in accordance with this invention. The chick box 10, as is conventional, has a bottom wall 11 defining a floor, a plurality of outer side walls 12, and interior walls 13 dividing the interior of the box into a plurality of compartments. As shown in that figure, the compartments within the chick box 10 are adapted to receive groups of chicks, indicated generally at 14, to be transported in the box from the hatchery to a purchaser.

A first form of supporting means and absorbent means in accordance with this invention is shown in FIGURES 1–5 and most clearly in FIGURES 2–5. A corrugated paperboard member 15 is removably supported in overlying, spaced relation to the bottom wall of each compartment of the chick box and substantially covers the same. The corrugated paperboard member 15 has an upper substantially planar surface defined by an upper sheet member 16, which forms a supporting means for the chicks 14. The paperboard member 15 is provided with a predetermined pattern of openings 17, as best shown in FIGURE 3, of sufficient size to permit the passage of droppings through the openings. Preferably, the openings 17 are formed by punctures which break or tear the paperboard material, as opposed to clean die cut openings, for purposes to be made more clear hereinafter, although any other method of producing suitable openings may be used to provide the predetermined pattern. The punctures 17 are of a size and spacing to form a regular pattern and to provide portions of sheet member 16 therebetween suitable for ready grasping by the feet of the chicks transported in the chick box to provide footholds for the chicks, and the broken corners of the punctures enhance this foothold feature. While various patterns, sizes and spacings for the openings may be found appropriate, where square openings are used as shown in FIGURE 3, they may be of about ¼-inch side length and placed on ½-inch centers in a rectilinear pattern.

In order to receive droppings passing through the punctures 17 formed in the paperboard member 15, an absorbent means is provided which preferably takes the form of a disposable pad 20 of creped paper or a similar cellulosic material, disposed intermediate the bottom wall 11 of the chick box and the paperboard member 15.

The paperboard member 15 also includes a lower sheet member 21 and an internal corrugated sheet 22 adhesively secured to the upper and lower sheet members to form the paperboard member 15. Preferably, depending resilient portions 23 are formed in the lower sheet member 21 upon formation of the openings 17, and normally rest on the pad 20 to resiliently support the upper sheet member 16 in spaced relation above the bottom wall 11 of the box 10.

While the openings 17 freely permit the passage of droppings therethrough to be received by the absorbent pad 20, the size of those openings 17 and the displacement of sheet member 16 above the absorbent pad 20, with respect to the size and reach of a chick's beak, are such as to inhibit access by chicks to the absorbent pad 20 and chick droppings collected thereby. Thus the chicks are prevented from scratching or pecking apart the absorbent pad 20 and consuming the absorbent material thereof and the droppings collected thereon.

Where a corrugated paperboard member 15 is used, it has been found that the absorbent capabilities of the corrugated construction are such that a separate absorbent pad 20 of creped paper or similar cellulostic material is not required in all circumstances to provide for the collection and partial absorption of chick droppings. Instead, lower sheet member 21 of the corrugated paperboard member 15 and internal corrugation sheet 22 thereof have been found to be sufficiently absorbent to serve as the absorbent means where smaller numbers of chicks are transported in a given compartment and the requirement for absorbing droppings is thus reduced. This absorbency of the interior portions of the corrugated member 15 is enhanced by the broken corners of the openings 17.

A second form of the combination in accordance with this invention is shown in FIGURES 6–8. In FIGURE 6, a chick box 30, substantially similar to chick box 10 of FIGURE 1, is shown and has a bottom wall 31, exterior walls 32 and interior walls 33, dividing the chick box into a plurality of compartments. These elements 31, 32, and 33, of the chick box 30 are similar to the elements 11, 12, and 13, of the chick box 10 shown in FIGURE 1. In further similarity to the chick box 10 of FIGURE 1, chicks 34 are contained in the interior compartments of the chick box 30 for shipment.

As best shown in FIGURES 7 and 8, a perforated plastic member 35, is removably supported in overlying spaced relation to the bottom wall of each compartment of the chick box 30 for supporting chicks thereon, and is provided with a predetermined pattern of openings therethrough for the same purpose as previously described openings 17. Resilient depending portions 36, formed integrally with the plastic member 35, resiliently support the member 35 at a predetermined spaced distance above the bottom wall 31 of the chick box 30.

Intermediate the plastic member 35 and the bottom wall 31 of the chick box 30 is positioned a disposable absorbent means, which preferably is a pad 37 of creped paper or a similar cellulosic material, similar to the pad 20 shown in FIGURES 1–5. In similarity to the previously discussed form, the openings in the plastic member 35 are of a spacing and size as to provide portions of the member 35 therebetween for ready grasping by the feet of the chicks to provide footholds and thereby to prevent injury or asphyxiation of chicks during handling of the box, and these openings are of sufficient size to permit passage of droppings therethrough to be received by and collected on the absorbent pad 37, while inhibiting access by the chicks to the absorbent pad and the droppings received thereby.

It is, therefore, considered apparent that a novel combination of a chick box with supporting means and chick dropping receiving, collecting and absorbing means has been illustrated and described which avoids the deficiencies of conventionally used chick shipment arrangements, by providing means for receiving chick droppings and means for inhibiting access to the droppings and consumption of the same by the chicks during shipment, with resulting deleterious effects on the health of the chicks, by supporting the chicks in spaced relation above the droppings.

In the drawings and specification there have been set forth preferred embodiments of the invention and, although specific terms are employed, they are used in a generic and descriptive sense only and not for purposes of limitation, the scope of the invention being defined in the claims.

I claim:

1. In a chick box for transporting chicks and having side walls, a bottom wall defining a floor and interior walls dividing the box into compartments, the combination therewith of means disposed within each of said compartments for supporting chicks above the bottom wall of the box and for receiving chick droppings and collecting these droppings beneath and in spaced relation to the chicks being supported, said means comprising:
   supporting means for supporting chicks thereon and having a plurality of spaced apart openings for the passage of droppings therethrough,
   a plurality of depending resilient support portions connected to said supporting means at spaced points throughout said supporting means including the central portion thereof and resiliently supporting said supporting means in spaced overlying relation to said bottom wall, and
   absorbent means disposed between said supporting means and the bottom wall and substantially coextensive with said supporting means for receiving, collecting and at least partially absorbing chick droppings passing through the openings in said supporting means.

2. In a chick box according to claim 1 wherein said supporting means is removably disposed within each of said compartments and has the plurality of openings therein of a size and spacing to permit the portions of the supporting means therebetween to be readily grasped by the feet of the chicks to provide footholds therefor, and wherein said absorbent means is removably disposed within each compartment of the box so as to be disposable.

3. A chick box according to claim 1 wherein said supporting means comprises a perforated paperboard member.

4. The combination as claimed in claim 3 further comprising:
   a plurality of depending resilient portions integrally formed with said paperboard member and resiliently supporting the same on said absorbent means with the upper surface of said paperboard member in spaced overlying relation to said bottom wall, and in which
   said plurality of spaced apart openings in said paperboard member are disposed in a predetermined pattern and are of a size and spacing to permit the portions of the paperboard member therebetween to be readily grasped by the feet of chicks to provide footholds for the chicks during handling of the box.

5. In a chick box according to claim 1 wherein said supporting means comprises a molded grid-like plastic member.

6. The combination as claimed in claim 5 further comprising:
   a plurality of depending resilient portions integrally formed with said plastic member and resiliently supporting the same on said absorbent means with the upper surface of said plastic member in spaced overlying relation to said bottom wall, and in which
   said plurality of spaced apart openings in said plastic member are disposed in a predetermined pattern and are of a size and spacing to permit the portions of the plastic member therebetween to be readily grasped by the feet of the chicks to provide footholds for the chicks during handling of the box.

7. In a chick box for transporting chicks and having side walls, a bottom wall defining a floor and interior walls dividing the box into compartments, the combination therewith of means removably disposed within each of said compartments for supporting chicks above the bottom wall of the box and for receiving chick droppings and collecting these droppings beneath and in spaced relation to the chicks being supported, said means comprising:
   a corrugated paperboard member including an upper sheet member for supporting chicks thereon and having a plurality of spaced apart openings therethrough disposed in a predetermined pattern for the passage of droppings therethrough and being of a size and spacing to permit the portions of said upper sheet therebetween to be readily grasped by the feet of chicks to provide footholds for the chicks during handling of the box,
   a plurality of depending resilient portions integrally formed with said paperboard member and resiliently supporting said upper sheet in spaced overlying relation to the bottom wall, and a disposable absorbent pad disposed between said paperboard member and the bottom wall and substantially coextensive with said paperboard member for receiving, collecting and at least partially absorbing chick droppings passing through the openings in said member.

8. In a chick box for transporting chicks and having side walls, a bottom wall defining a floor and interior walls dividing the box into compartments, the combination therewith of means removably disposed within each of said compartments for supporting chicks above the bottom wall of the box and for receiving chick droppings and collecting these droppings beneath and in spaced relation to the chicks being supported, said means comprising:

a molded plastic member, for supporting chicks thereon and having a plurality of spaced apart openings disposed in a predetermined pattern for the passage of droppings therethrough and being of a size and spacing to permit the portions of said plastic member therebetween to be readily grasped by the feet of chicks to provide footholds for the chicks during handling of the box, a plurality of depending resilient support portions integrally formed with said plastic member at spaced points throughout said plastic member including the central portion thereof and resiliently supporting the same in spaced overlying relation to the bottom wall, and a disposable absorbent pad disposed between said plastic member and the bottom wall and substantially coextensive with said plastic member for receiving, collecting and at least partially absorbing chick droppings passing through the openings in said plastic member.

9. In a chick box for transporting chicks and having side walls, a bottom wall defining a floor and interior walls dividing the box into compartments, the combination therewith of means disposed within each of said compartments for supporting chicks above the bottom wall of the box and for passing chick droppings therethrough and therebetween to be collected in spaced relation to the chicks being supported, said means comprising:

a corrugated paperboard member including an upper sheet member, a lower sheet member and a corrugation member secured therebetween and said member having a plurality of spaced apart openings of sufficient size to permit the passage of droppings thereinto, and a plurality of depending resilient portions integrally formed with said paperboard member by portions of said lower sheet member bounding said openings and resiliently supporting said upper sheet member in spaced relation to the bottom wall for supporting chicks on said upper sheet member, said lower sheet member and corrugation member being adapted to receive, collect and at least partially absorb chick droppings.

10. In a chick box for transporting chicks and having side walls, a bottom wall defining a floor and interior walls dividing the box into compartments, the combination therewith of means disposed within each of said compartments for supporting chicks above the bottom wall of the box and for passing chick droppings therethrough and therebetween to be collected in spaced relation to the chicks being supported, said means comprising:

a corrugated paperboard member including an upper sheet member, a lower sheet member and a corrugation member secured therebetween and said member having a plurality of spaced apart punched openings disposed in a predetermined pattern to permit the passage of droppings thereinto and being of a size and spacing to permit the portions of said paperboard member therebetween to be readily grasped by the feet of chicks to provide footholds for the chicks during handling of the box, and a plurality of depending resilient portions integrally formed with said paperboard member by portions of said lower sheet member bounding said openings and resiliently supporting said upper sheet member in spaced relation to the bottom wall for supporting chicks on said upper sheet member, said lower sheet member and corrugation member being adapted to receive, collect and at least partially absorb chick droppings.

References Cited
UNITED STATES PATENTS

| | | | |
|---|---|---|---|
| 2,026,417 | 12/1935 | Conway et al. | 119—19 |
| 2,134,051 | 10/1938 | Kirby | 229—31 |
| 2,709,031 | 5/1955 | Gondek | 229—6 |
| 2,963,003 | 12/1960 | Oberg et al. | 119—1 |
| 3,048,147 | 8/1962 | McKean | 119—19 |
| 3,126,867 | 3/1964 | Kundikoff | 119—19 |
| 3,195,505 | 7/1965 | Hauth et al. | 119—17 |
| 3,227,139 | 1/1966 | Gass et al. | 119—18 X |

SAMUEL KOREN, *Primary Examiner.*

ALDRICH F. MEDBERRY, *Examiner.*